United States Patent [19]

Fleck

[11] 4,276,610

[45] Jun. 30, 1981

[54] PROGRAMMABLE SEQUENCER APPARATUS

[75] Inventor: William C. Fleck, Palisades Park, N.J.

[73] Assignee: Intraspec Inc., Bogota, N.J.

[21] Appl. No.: 6,576

[22] Filed: Jan. 26, 1979

[51] Int. Cl.³ .................... G06F 3/03; G06F 3/153; G05B 19/10
[52] U.S. Cl. ................... 364/900; 364/104
[58] Field of Search ............... 364/104, 200 MS File, 364/900 MS File, 300

[56] References Cited

U.S. PATENT DOCUMENTS

| | | | |
|---|---|---|---|
| 3,686,639 | 8/1972 | Fletcher et al. | 364/200 |
| 3,922,889 | 12/1975 | Karklys | 364/104 |
| 3,936,664 | 2/1976 | Sato | 364/104 |
| 4,006,464 | 1/1977 | Landell | 364/104 |
| 4,068,155 | 1/1978 | Robbins et al. | 364/104 |
| 4,084,237 | 4/1978 | Beacham et al. | 364/104 |

*Primary Examiner*—Harvey E. Springborn
*Attorney, Agent, or Firm*—Lerner, David, Littenberg & Samuel

[57] ABSTRACT

Programmable sequencer apparatus for enabling an operator to selectively establish sequential energizing patterns for a plurality of outputs and thereafter for causing said plurality of outputs to be selectively energized in the sequences defined is set forth in accordance with the teachings of the present invention. According to a preferred embodiment, programmable sequencer apparatus is provided for controlling the selective energization of a plurality of outputs under conditions where any of the plurality of outputs may be selectively energized as a step of a sequence, a group of steps may be established in a sequence to define a programmed operating formula for equipment to be controlled and a plurality of operating formulas may be established to accommodate various modes of operation. A light emitting diode is provided to designate an energized state for each of the plurality of outputs, and indicators are provided to display the step, time of operation for that step and the formula being programmed or initiated. During a program mode, the step and formula being programmed is displayed and each light emitting diode is illuminated in sequence. Desired ones of the plurality of outputs to be energized during that step may be selected when its corresponding light emitting diode is illuminated. Upon selection, the corresponding light emitting diode is retained in an illuminated condition while the sequential illumination of remaining ones of the light emitting diodes continues until the sequence is completed. When the sequential illumination of all of the light emitting diodes for a given step has been completed, the time of energization for the selected outputs in that step is selected and displayed. Subsequently, information corresponding to the formula, step and duration of the step is stored whereupon a succeeding step in that formula may be defined in the foregoing manner. This is continued until all steps for a given formula are programmed and may be followed by creation of additional formulas. Upon completion of the program mode, the programmable sequencer apparatus may be placed in a Run mode and selected outputs energized in the sequential manner defined by the steps of the operating formula selected.

7 Claims, 3 Drawing Figures

PROGRAMMABLE SEQUENCER APPARATUS

FIELD OF THE INVENTION

This invention relates to sequencer apparatus and more particularly to programmable sequencer apparatus for selectively enabling a plurality of outputs according to predetermined sequences.

BACKGROUND OF THE INVENTION

This invention relates to programmable sequencer apparatus which has a multiplicity of uses. A specific and very important use for a programmable sequencer as disclosed in this application is the control of wash wheels in the laundry industry.

There exists in the United States today a substantial number of wash wheels being employed in commercial laundries which are programmably controlled by mechanical switches driven by a motor which interact with a nonconducting program chart having holes cut therethrough to determine the sequence of operations (or formula) required by the particular type of washing being done by the wash wheel under control. For example, the existing controls can set temperature of water, introduction of steam, introduction of chemicals and in addition, the time interval and sequence of each of the above.

The existing controls suffer from many disadvantages. First, the generation of program charts for the existing controls require from a half hour to forty-five minutes of a skilled operator's time. Further, if an error were made in the cutting of a program chart, in most instances the chart would have to be discarded completely and a new chart started from scratch. Further, if it is desired to change a program, the existing chart, in most instances, would be discarded and a new chart cut.

A further problem which exists with the current controls is the fact that the electrical contacts thereof are exposed to the air. It is not practical to seal these contacts since the program chart is physically placed between the operative contacts. Thus the advances in sealing of relay contacts which have occurred over the last twenty years or so cannot be used to advantage in the controls presently in the field. As a result of this exposure of the contacts, substantial corrosion occurs, particularly in the humid and corrosive environment of a commercial laundry. This results in downtime of the machinery and extensive repair costs.

A further problem which exists with the existing controls is the fact that skilled operators are required to align the program charts or else the machinery will not function properly.

BRIEF DESCRIPTION OF THE INVENTION

In accordance with the teachings of this invention programmable sequencer apparatus is provided which can be programmed to perform the functions of the existing mechanical sequential timers in approximately five to ten minutes. With the system of this invention, errors can be corrected and changes made in programs in a matter of seconds. The system of this invention allows the use of hermetically sealed relay contacts in place of the contacts of the existing equipment.

The above advantages are accomplished in this invention by providing sequencer apparatus which provides a sequential pattern of signals on a plurality of outputs. The system of this invention includes a plurality of selectively energizable indicators, which in the preferred embodiment of this invention are light emitting diodes. Each of the plurality of outputs has one of the plurality of selectively energizable indicators corresponding thereto. The plurality of energizable indicators are sequentially energized in a predetermined sequence. Upon actuation of a switch during the energization of one of the plurality of selectively energizable indicators data is stored in a temporary data storage register indicative of which of the plurality of selectively energizable indicators had been energized at that time. Upon actuation of a second switch, the data in the temporary data storage register is transferred to a predetermined location in the program memory and the plurality of selectively energizable indicators are again energized in the predetermined sequence.

In the preferred embodiment of this invention, a numerical display is also provided for displaying a number indicative of the interval of time a programmed step is to be performed. The numerical display is energized to sequentially display a sequence of numbers. When the first switch is actuated during the sequential display of numbers, data is provided to the temporary storage register which is representative of the number being displayed. This data will also be transferred to a predetermined location in program memory upon an activation of the second switch. The predetermined location in the program memory is also changed at this time so that a second step in the program can be programmed.

The invention further provides in the preferred embodiment that if the first switch is actuated during the energization of a predetermined one of the selectively energizable indicators, a program completion signal is provided to the temporary data storage register indicating that a program has been completed.

DESCRIPTION OF THE DRAWINGS

For a more complete understanding of the invention, reference should be made to the following detailed description and drawings in which.

DETAILED DESCRIPTION OF THE DRAWINGS

Figure 1:
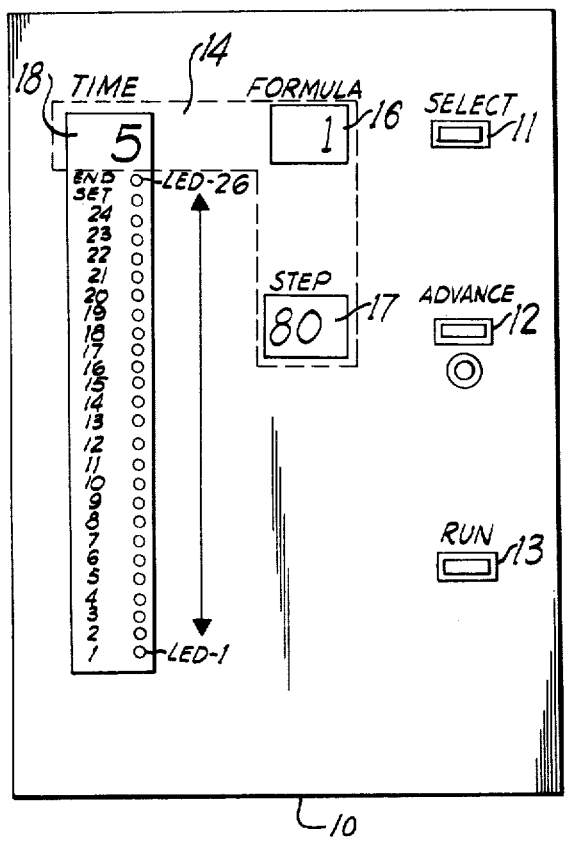
FIG. 1 is a front view of a control panel of exemplary programmable sequencer apparatus which incorporates the teachings of this invention.

Referring now to FIG. 1, we see a front panel 10 of a sequential timer incorporating the teachings of the invention having three lighted pushbutton switches 11, 12 and 13. The switch 11 is labeled SELECT, the switch 12 is labeled ADVANCE, while the switch 13 is labeled RUN.

To the left of the switches are numeric displays 14 (grouped together for representational purposes by dashed lines) which include a display 16 having the label FORMULA there above, a display 17 having the label STEP there above, and a display 18 having the label TIME there above. Each of the displays 16, 17 and 18 are capable of displaying the numbers 1 through 99.

Below the display 18 is a line of 26 light emitting diode LED 1 through LED 26. Adjacent to LED's 1 through LED 24 is a number. Adjacent to the LED's 25 and 26 are the labels SET and END.

Figure 2:
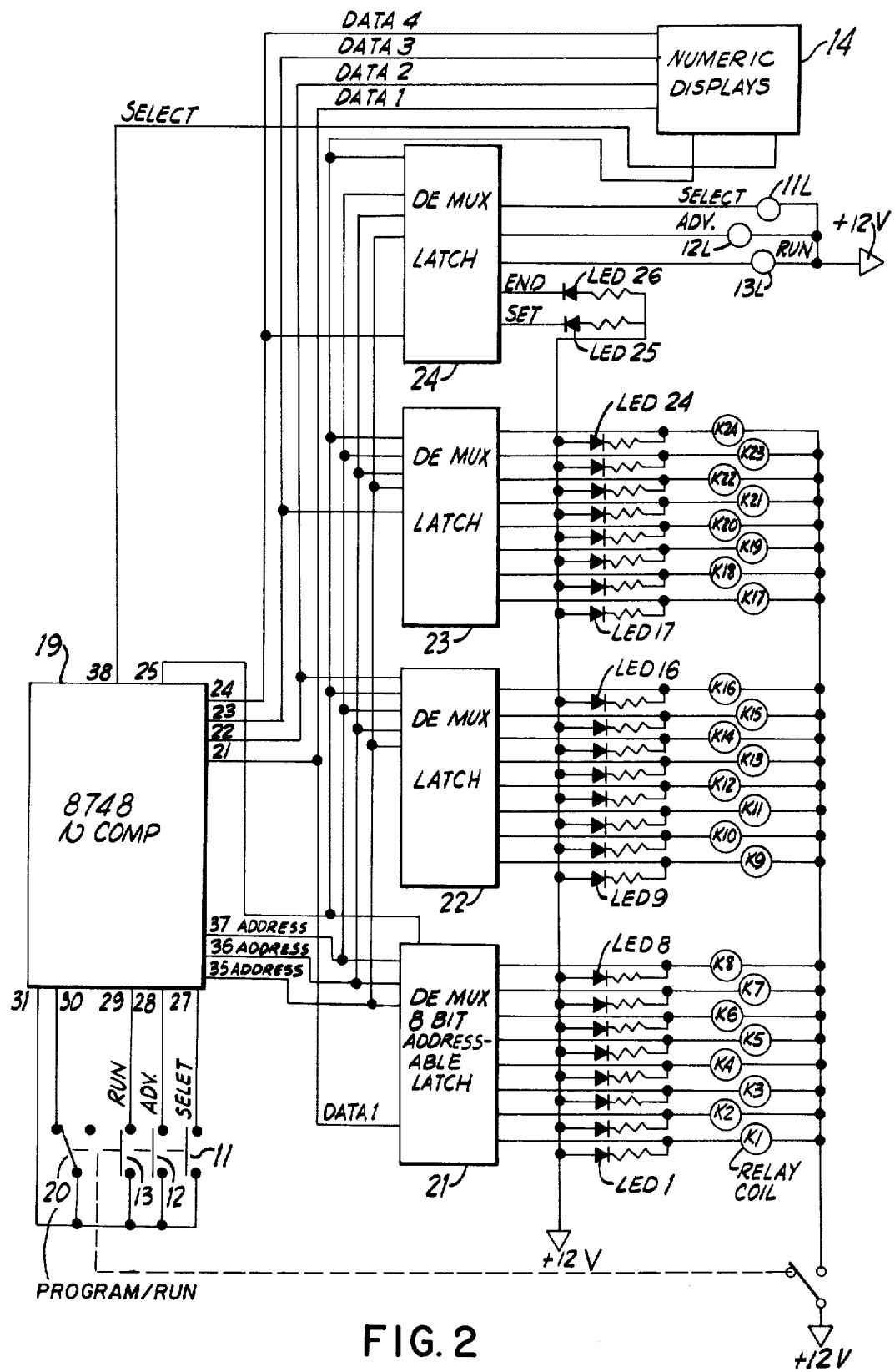
FIG. 2 is a block diagram showing the interconnection of the elements on the front panel in FIG. 1 and the circuitry which operates the same.

The display and pushbutton switches shown in FIG. 1 are employed to monitor and control circuitry shown in FIG. 2 which sequentially and programmably controls the opening and closing of 24 relays having coils K1 through K24 shown in FIG. 2. The circuit of FIG. 2 includes a microcomputer 19. The microcomputer 19 may take any of the well-known forms of this conventional class of device, for instance, a 8748, microcomputer, available in the form of a single chip from the Intel Company of California, may be employed. This microcomputer includes an 8 bit CPU, 1K words of programmable memory and 64 words of data memory as well as a temporary storage register. The microcomputer 19 is connected to the switches 11, 12 and 13 as well as a switch 20 which is not on the front panel 10. The switch 20 is a program/run switch which in the position shown, enables the sequencer to be programmed from the front panel while in the run position merely enables the sequencer to operate in one of the pre-programmed modes. Thus, the switch 20 would normally be mounted so as to be accessible only to personnel authorized to change programs.

The circuitry of the FIG. 2 further includes four identical latch means 21, 22, 23 and 24, which may take the form of conventional, addressable latch means including demultiplexer and latching output circuitry. Each of the chips 21 through 24 may take the form of CD4099 chips such as those made available by many companies including R.C.A. a Corporation of New Jersey.

The circuitry of FIG. 2 also includes the numerical displays 14 and incandescent lamps 11L, 12L and 13L, each of which is physically associated with the corresponding numbered switches 11, 12 and 13, as well as LED1 through LED26. The relays K1 through K24 in the preferred embodiment of this invention operate a wash wheel.

In operation, the microcomputer 19 has stored in its memory a number of programs or formulas for operation of the wash wheel, each of which has a number associated therewith. To operate the wash wheel, the switch 20 is placed in the RUN mode disconnecting a program input to the microcomputer 19 and applying +12 volts to one side of each of the relay coils K1-K24, and the button 11 is depressed until the display 16 displays the number of the formula which is desired. This depression of the button 11 in fact advances the microprocessor to a predetermined memory location which is the beginning of the formula to be run. After the formula is selected, the run switch 13 is depressed and the microcomputer 19 generates signals to operate the multiplexer and latches 21, 22, 23 and 24 to drive the relay coils K1 through K24 in accordance with the formula selected. The associated LED1 through LED24 are simultaneously actuated with the corresponding relay coils K1-K24, so that while the wash wheel is being operated, a pattern of lights on the front panel shown in FIG. 1 show an operator which relays are energized.

In order to initially place the formulas into the memory of the microcomputer 19 or to modify ones already stored therein, the switch 20 is placed in the position as shown in FIG. 2. In this mode, the +12 volt supply is disconnected from the relay coils K1 through K24 so that they are not energized. Thus, when the microprocessor 19 provides drive signals, the numeric displays and LED's are operated, but the relays K1 through K24 and thus the wash wheel itself are not actuated.

In this mode, the select switch 11 is also activated to select the formula desired. When formulas are already stored in the microcomputer 19 or an associated memory, the select switch 11 sequentially addresses the microcomputer 19 stepwise through addresses which correspond to the beginning of the already loaded formulae. When formulae are being inserted for the first time, the select switch 11 addresses available memory locations for the storage of such formulae. The display 16 displays the number of the formula which has been selected. The number 1 appears in the display 17, indicating that the first step is about to be programmed.

At this point the run switch 13 is depressed, which initiates sequential illumination of the LED's 1 through 26 by the microcomputer 19, each for a predetermined interval of time, preferably about three-quarters of a second. In order to program the first step of the formula, an operator releases the run switch 13 during each interval that a LED is illuminated which is associated with a relay coil K1 through K24 which is to be actuated during step 1 of that formula. This transfers data to one portion of the memory of the microcomputer 19, to a storage register therein, indicative of the LED illuminated at that time. The selected LED is held on until the entire step is programmed so that the operator knows which LED's have been selected at that step. Thus, if relay coils K3, K8 and K10 are to be energized during step 1 of formula 1, the operator would release the run switch 13 once during each of the intervals that the LED's 3, 8 and 10 were illuminated. After the sequence of LED's have been illuminated, the time display 18 is actuated by the microcomputer 19 to display numbers which are related to time in minutes. Thus, initially, the number 1 is illuminated in the display 18 and every three-quarters of a second such display is incremented by the number 1 until 14 minutes are displayed. Of course, this is not restricted to use of minutes. By again releasing the run button 13, the display 18 is stopped at the time interval that is desired for step 1, and data indicative of that number is transferred to the storage register.

At this time, if the display 18 has the appropriate time interval showing thereon and the appropriate LED's are illuminated, the operator depresses the advance switch 12 which transfers data from the storage register to the appropriate memory locations and advances the step display 17 to the next number. The above sequence is again repeated until the entire formula is entered. At this time, the run switch 13 is depressed until LED 26 is illuminated indicating the end of the formula and providing such data to the storage register. The advance switch 12 is then depressed to enter the end of formula into memory.

At this time, the step display 17 again displays step 1 illuminating all of the LED's which are to be energized during step 1 of that formula and the proper time interval for that step. If the operator is satisfied that step 1 has been properly programmed, the advance switch 12 is again depressed to sequentially step through the steps and review the same. If on the other hand the first or any other step is incorrectly entered into the memory, the run switch 13 is depressed and that step can be reprogrammed as discussed above.

When the formulas have been entered, the switch 20 is transferred to the run mode and the sequencer is set for operation. As discussed above, the switch 20 is normally inside of the equipment so that a casual operator cannot inadvertently alter the programs.

Figure 3:
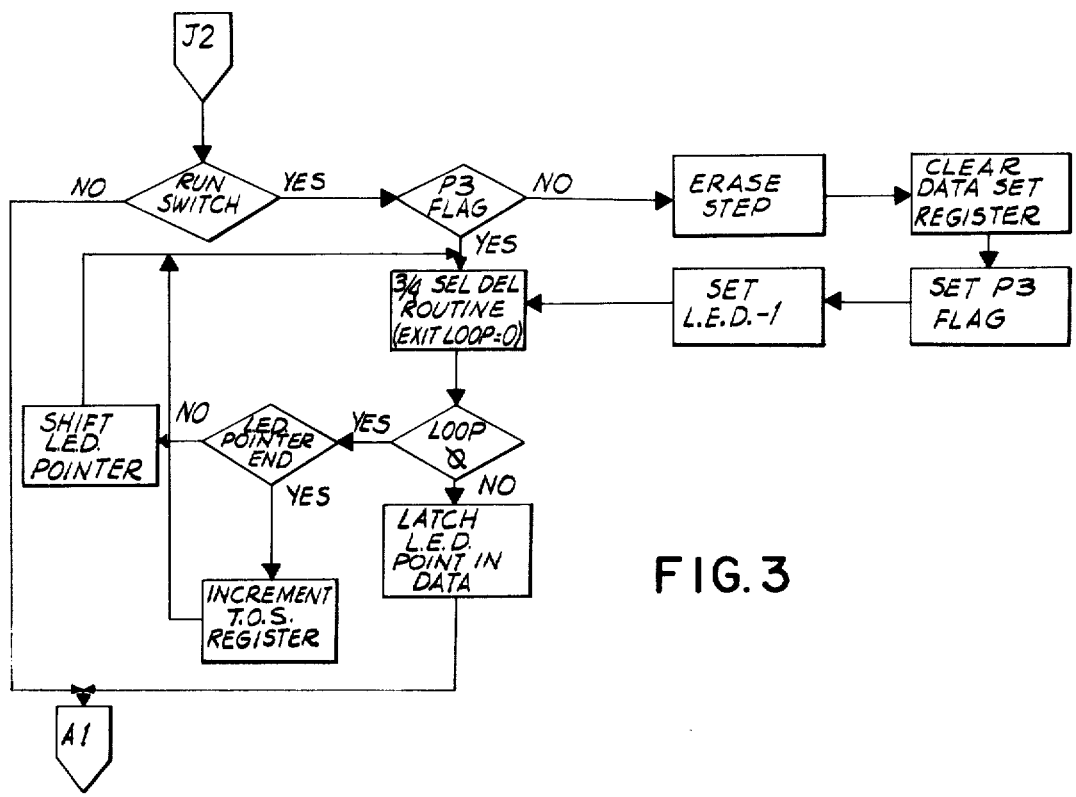
FIG. 3 is a flow chart illustrating an exemplary control program for operating the embodiment of this invention illustrated in FIG. 2 under microcomputer control.

The microcomputer 19 performs the steps of sequentially lighting the LED's 1 through 26, the displays 16, 17 and 18 in response to the switches 11, 12, 13 and 20 as discussed above in accordance with an algorithm shown in flow chart form in FIG. 3. Of course, it is understood that this algorithm can be a portion of a larger algorithm which does other operations within the microcomputer 19. When the algorithm reaches the point labeled J2 in FIG. 3, it manipulates the microcomputer 19 to determine if the run switch 13 is depressed. If it is not depressed, the algorithm follows the line labeled NO and by-passes the algorithm. If, on the other hand, the run switch 13 is depressed, the algorithm of FIG. 3 follows a line labeled YES, and determines if the internal flag P3 in the microcomputer 1 is in a first or second position. The flag P3 is in its first position if the run button 13 had not been depressed before and is in the second position if the run button 13 has been depressed once or more since the select switch 11 or the advance switch 12 had last been depressed. If the flag is in its first position, the algorithm follows the NO path and erases the memory which the step to be entered is to be stored. Next, a data-set register (the temporary storage register) is cleared to enable it to be ready to receive the data to be entered from the further actuation of the run switch 13. Next the P3 flag is set so that on the next occurrence of the closure of the switch 13, the P3 flag question will be answered YES rather than NO, sending the algorithm along the alternate path. The P3 flag is reset when power is initially turned on or the select switch 11 or the advance switch 12 is depressed.

The LED1 is also set and a three-quarter second delay routine is initiated. That routine involves the advancing of a counter and a periodic checking to determine if the run switch 13 has been released. If the run switch 13 has not been released at the end of the three-quarters of a second, the loop equal to zero question is answered YES and that path is followed. Unless the end LED, LED-26 has been or is illuminated, the LED pointer end question is answered NO and the next LED is illuminated by the shift LED pointer instruction. The algorithm then proceeds directly to the three-quarter second delay routine which will follow the path described above, if the run switch 13 has still not been released. Thus, it can be seen that the LED's 1 through 26 can be sequentially illuminated with nothing else occurring if the run switch 13 is continuously maintained in its depressed position.

If, on the other hand, the run switch 13 is released while a particular LED is illuminated, the three-quarter second delay routine, when interrogated by the loop=0 question provides an indication of NO so that the latch LED point in data instruction is implemented storing the data as to which LED is illuminated in the data set register and latches that LED to remain illuminated. From here, the algorithm is exited at A1 which could go to other routines or return directly back to J2.

On the next pass through the algorithm shown in FIG. 3, if the run switch has not been again depressed, the algorithm will be followed as in the previous pass and the algorithm will be exited in the same fashion without shifting the illumination of the LED. If, on the other hand, the run switch 13 had been depressed, the YES path from P3 flag is followed, and the three-quarter second delay routine will again determine if the run switch 13 has been lifted off during the three-quarter second interval. If it had been, the same path as above will again be followed and the same LED will remain illuminated so that it is seen that it is necessary to depress the run switch 13 for at least three-quarters of a second to advance to the illumination of the next LED. When this occurs, the loop=0 question is answered YES, the shift LED pointer instruction is implemented and the next LED is illuminated.

Upon the next entry into the algorithm of FIG. 3, the P3 flag question is answered YES and the program continues to run as described above in accordance with the circumstances which occur with regard to the depressing or releasing of the run switch 13 until all of the desired LED's have been illuminated.

The next time the algorithm is run with the run switch 13 depressed, the three-quarter second delay routine enables the loop=0 question to be answered YES, and the LED pointer end question will answer YES, beginning the increment TOS register instruction which begins to increment a register which advances the number in the display 18 once each three-quarters of a second representing an increase in actual running time of one minute for the step being programmed. When the proper time to be programmed for the step is displayed on the display 18, the operator again manipulates the switch 13. Upon the passing through of the program upon this occurrence, the latch LED point in data instruction transfers the time then being displayed on the display 18 to the data set register along with the information relating to the particular LED's which illuminated when the switch 13 had previously been actuated.

At this point, pressing the advance switch 12 transfers the information from the data set register into memory and enables the beginning of the sequence to occur again with the number of the next step being displayed in the step display 17. When the switch 13 is manipulated so that LED 26 is illuminated, data is transferred to the data set register indicating that this is the end of the formula.

Thus it is seen that a system has been described outlining a method and apparatus of simply and easily entering information for sequentially opening and closing a plurality of relays employing a single switch which enables an unskilled operator to simply and easily perform such function.

It is, of course, understood that it would be a rather straightforward and simple matter at this point to sequentially display the steps of the formula by calling up from memory step-by-step information stored therein and displaying the same on the LED's and displays upon which such formula was entered. Thus an operator can easily check the accuracy of such entries. In accordance with the preferred embodiment of this invention, the formula is automatically displayed for editing or checking purposes upon the entering of the end of the formula information.

It is, of course, understood that while this invention has been described with respect to a particular embodiment thereof, numerous others will become obvious to those of ordinary skill in the art in light hereof.

What is claimed is:

1. Programmable sequencer apparatus for selectively establishing sequential energizing patterns for a plurality of outputs in response to stored data, said programmable sequencer apparatus comprising:

a plurality of selectively energizable indicating means, each of said plurality of outputs having one of said plurality of selectively energizable indicating means corresponding thereto;

means for energizing said selectively energizable indicating means in a predetermined progressive sequence;

first operator actuatable means for selectively interrupting said progressive sequence and for subsequently continuing said progressive sequence toward a completion of a particular predetermined progressive sequence;

first means responsive to each interruption in said progressive sequence initiated by said first operator actuatable means during a particular predetermined progressive sequence for temporarily storing data corresponding to a one of said plurality of selectively energizable indicating means energized during the occurrence of said interruption;

second operator actuatable means for indicating that temporarily stored data for a particular predetermined progressive sequence is representative of a selected energizing pattern in a sequence of energizing patterns; and second means responsive to said second operator actuatable means for storing said temporarily stored data as an ordered step within a series of steps being established to represent said sequence of energizing patterns.

2. The programmable sequencer apparatus according to claim 1, wherein said means responsive to said second operator actuatable means additionally acts to establish conditions precedent to defining and storing a next ordered step within said series of steps being established during a next succeeding predetermined progressive sequence of energizing said selectively energizable indicating means.

3. The programmable sequencer apparatus according to claim 2, wherein one of said plurality of selectively energizable indicating means designates an end condition and said means responsive to each interruption initiated by said first operator actuatable means is responsive to an interruption occurring when said end condition indicating means is energized to temporarily store data defining an end to a sequence of energizing patterns.

4. The programmable sequencer apparatus according to claim 3, wherein said means responsive to said second operator actuatable means is additionally responsive to an actuation of said second operator actuatable means and temporarily stored data defining an end to a sequence of energizing patterns to store data establishing an end to said series of steps being established to represent said sequence of energizing patterns.

5. The programmable sequencer apparatus according to claims 1, 2, 3, or 4, additionally comprising:

display means for numerically indicating increments of time during which a selected energizing pattern is to continue;

enabling means responsive to a completion of each predetermined progressive sequence of energizing said selectively energizable indicating means for enabling said display means to display an initial numerical increment; and third means responsive to an enabling of said display means and an actuation of said first operator actuatable means for incrementing said display means at a predetermined rate and terminating said incrementing of said display means upon a release of said first operator actuatable means, said third means temporarily storing a value representative of the increments of time displayed upon a terminating of said incrementing of said display means; said second means responsive being active upon an actuation of said second operator actuatable means to store temporarily stored value as part of said ordered step to define said energizing pattern and the duration thereof.

6. The programmable sequencer apparatus as defined in claim 1, wherein each of said selectively energizable indicating means is a light emitting diode.

7. The programmable sequencer apparatus defined in claim 1, wherein said plurality of outputs are provided as relay closures.

* * * * *